(12) United States Patent
Nix et al.

(10) Patent No.: US 8,704,651 B2
(45) Date of Patent: Apr. 22, 2014

(54) METHOD FOR ATTRIBUTING EQUIPMENT OPERATION TO A SPECIFIC OPERATOR

(75) Inventors: Axel Nix, Birmingham, MI (US); Marc Rosenmayr, Novi, MI (US); Brigitte Dorothea Nitsche, Lippstadt (DE); Thomas Patrick Harvey, Novi, MI (US)

(73) Assignee: Hella KGAA Hueck & Co., Lippstadt (DE)

( * ) Notice: Subject to any disclaimer, the term of this patent is extended or adjusted under 35 U.S.C. 154(b) by 1607 days.

(21) Appl. No.: 11/700,776

(22) Filed: Feb. 1, 2007

(65) Prior Publication Data

US 2008/0186282 A1 Aug. 7, 2008

(51) Int. Cl.
*B60Q 1/00* (2006.01)

(52) U.S. Cl.
USPC .............................. 340/438; 701/36; 345/156

(58) Field of Classification Search
USPC .......... 340/438, 441, 825.71, 286.01; 701/36; 345/156, 173
See application file for complete search history.

(56) References Cited

U.S. PATENT DOCUMENTS

| | | | |
|---|---|---|---|
| 5,811,897 A | 9/1998 | Spaude et al. | |
| 6,611,243 B1 | 8/2003 | Moseley et al. | |
| 6,771,161 B1 | 8/2004 | Doi et al. | |
| 6,954,185 B2 | 10/2005 | Ogino | |
| 7,009,488 B2 * | 3/2006 | Schwartz et al. | 340/5.2 |
| 7,034,657 B2 * | 4/2006 | Ueda et al. | 340/5.62 |
| 7,969,423 B2 * | 6/2011 | Kawabe | 345/173 |
| 8,116,937 B2 * | 2/2012 | Kumon et al. | 701/36 |
| 8,410,794 B2 * | 4/2013 | Nakayama et al. | 324/658 |
| 2006/0261672 A1 | 11/2006 | Richter | |
| 2009/0231145 A1 * | 9/2009 | Wada et al. | 340/575 |
| 2012/0101689 A1 * | 4/2012 | Schramm | 701/45 |
| 2012/0268404 A1 * | 10/2012 | Kuhn et al. | 345/173 |
| 2013/0304315 A1 * | 11/2013 | Stoyanov et al. | 701/36 |

FOREIGN PATENT DOCUMENTS

| | | |
|---|---|---|
| DE | 103 05 341 A1 | 8/2004 |
| DE | 10 2004 033 275 A1 | 2/2006 |
| EP | 1 168 678 B1 | 9/2003 |
| EP | 1 710 672 A2 | 10/2006 |
| GB | 2 428 094 A | 1/2007 |
| WO | WO 2004/022388 A1 | 3/2004 |
| WO | WO 2004/078536 | 9/2004 |

* cited by examiner

*Primary Examiner* — George Bugg
*Assistant Examiner* — Edny Labbees
(74) *Attorney, Agent, or Firm* — Muncy, Geissler, Olds & Lowe, P.C.

(57) ABSTRACT

A system, apparatus, and method are provided for controlling equipment operable by a plurality of operators. A control state evaluation device is configured to evaluate a control state of an equipment control. A signal detection device is configured to detect if a signal associated with an operator of the equipment control is present. A process controller is configured to activate a first equipment function if the signal from the equipment control is present, and is configured to activate a second equipment function if the signal is not present.

37 Claims, 9 Drawing Sheets

| Reason | Configuration Name | Signal Coupling | Function A | Function B | |
|---|---|---|---|---|---|
| Safety | Driver Lockout | Driver Seat | Inactivity | Normal Operation | 300 / 302 |
| | Driver Only | Driver Seat | Normal Operation | Inactivity | 304 |
| | Passenger Only | Passenger Seat | Normal Operation | Inactivity | 306 |
| | Passenger Lockout | Passenger Seat | Inactivity | Normal Operation | 308 |
| Common Controls | Driver Default | Passenger Seat | Passenger Function | Driver Function | 310 |
| | Passenger Default | Driver Seat | Driver Function | Passenger Function | |

FIG. 3

METHOD FOR ATTRIBUTING EQUIPMENT OPERATION TO A SPECIFIC OPERATOR

TECHNICAL FIELD

This description relates to attributing the operation of equipment to an operator among multiple operators.

BACKGROUND OF THE INVENTION

Vehicles contain a plurality of controls that are located within reach of both a driver and a front passenger, and therefore the controls can be operated by either the driver or the front passenger. The controls, e.g. switches, knobs, buttons, rotary controllers, and user input devices, such as touch screens, are used to control and/or monitor various pieces of equipment, e.g. interior lights, radio, CD-player, navigation system, phone and air conditioning. Multi-function controls may be used to reduce the number of dedicated controls, especially where the complexity of the controlled equipment requires a reduction in the number of controls. Further, reducing the number of controls may be desirable to enable aesthetically pleasing interior vehicle designs. For example, a clean look with few controls may be preferred over perceived clutter where many different controls are present. One particularly versatile form of multi-function control utilizes touch screens which can show buttons on a display, detect where the display is being touched and correlate both button position and touch position to activate an equipment function associated with the displayed button.

The increase in functions and controls thereof that are available to the driver may also raise concerns about the driver becoming distracted while operating the vehicle. Accordingly, equipment controls or functions may be grouped into functions that can safely be operated while driving and functions that should not be operated while driving. For example, lockout protocols may be used to allow the operation of certain equipment functions only while the vehicle is stopped or the transmission is shifted into park.

Various controls or functions may also be designated as being exclusively operated by the driver. For example, keyless go systems allow the starting of a vehicle's engine with the push of an engine start button, e.g., if a wireless user identification device is present in the vehicle thereby eliminating the need to insert a key in an ignition lock. The remote ignition control device may also require that the user be within a limited area with respect to the driver's seat before the engine may be started remotely. The wireless identification device may also restrict the ability to start the engine so that only the driver can operate the engine start button.

Dual view displays are also being used in vehicles to show one image to the driver and a different image to the passenger. For example, in some dual view displays, different images are visible depending on the viewing angle. Therefore, dual view displays enable the driver to see a first image, e.g., a navigation map, while the passenger watches a second image, e.g., a DVD movie on the same physical display screen.

U.S. Pat. No. 7,009,488 (Schwartz) relates to an exemplary method for selectively locking controls available to an operator, the entirety of which is hereby incorporated by reference. The method actively detects when an operator accesses a control for which a lockout is desired. The active detection of when an operator is accessing a control is performed by first generating a signal, which is passed to a plate, where it is then coupled through the operator to a receiver. The signal is detected at a signal detector associated with a control so the control can react to the signal.

PCT Publication WO2004/078536 (Donat) relates to a circuit for selectively producing switching signals. The circuit is characterized in that a signal is emitted and is transmitted via the user during the actuation of the switching device. The signal is capacitively coupled into the user at the switching device. A seat heating matt can be used as a signal receiving surface. Driver and Passenger in a vehicle can be distinguished through two receivers, one located in the driver's seat and one located in the passenger's seat. If the signal path is reversed, different users can be distinguished by coupling different frequencies into each user and evaluating the received frequency at the switching device.

SUMMARY OF THE INVENTION

Existing methods of distinguishing driver and passenger operation of equipment in a vehicle use multiple signal generators in combination with a common signal detector or one signal generator in combination with multiple signal detectors. However, a more cost effective solution without the need for redundant hardware is desirable. Further, consideration of previously neglected failure modes including intentional manipulation is desirable.

One or more of the following embodiments attributes equipment operation in a vehicle to a specific operator to promote safety and to enable use of common controls for different functions among multiple operators. The number of signal generators or signal detectors to distinguish operators may be reduced, thus providing a more cost effective way with a single signal and simple logic. In addition, or alternatively, a robust solution which considers previously neglected failure modes, including intentional manipulation of driver or passenger lockout configurations, is provided in a system easily integrated into a vehicle.

In one general aspect, a system for controlling vehicle equipment includes a signal generator, a conductive surface operatively connected to the signal generator, and a touch screen apparatus. The touch screen apparatus includes a touch screen, a control state evaluator operatively connected to the touch screen, a signal detector operatively connected to the touch screen, and a process controller configured to detect an output from the signal detector and an output of the control state evaluator. The controller is configured to activate a first function based upon a detected signal from the signal generator, and is configured to activate a second function if the signal from the signal generator is not detected.

Implementations of this aspect may include one or more of the following features. For example, the conductive surface may be provided within a passenger's seat within a vehicle. The seat may be a driver's seat, or a seat adjacent to a driver's seat within a vehicle. The process controller may be configured to associate a first system user, based upon the detected signal, with the output of the control state evaluator. The process controller may be configured to associate another system user, if the signal from the signal generator is not detected by the signal detector, with the output of the control state evaluator.

The system may include a seat operatively coupled with the signal generator, wherein the signal detector is configured to detect a signal passing from the signal generator, through the conductive surface and a user to the touch screen. The signal detector may be configured to detect the signal passing through an operator seated within the seat. The signal generator may be a keyless go device, and the process controller may be configured to identify a user based upon the signal from the keyless go device. The touch screen apparatus may be a dual view touch screen device, capable of simultaneously presenting different displays to different users. The conductive surface may be a seat heating matt within a vehicle seat, and the signal generator may be capacitively, resistively, or electrostatically coupled with the seat heating matt. The system may include a common mode rejection choke operatively connected between the seat heating matt and a vehicle power supply and ground.

In another general aspect, a method for controlling equipment includes evaluating a control state of an equipment control, and detecting whether a signal associated with an operator of the equipment control is present. Based upon the evaluated control state, a first equipment function is activated if the signal from the equipment control is present, or a second equipment function is activated if the signal is not present.

Implementations of this aspect may include one or more of the following features. For example, the equipment control may be a touch screen for a touch screen apparatus. The equipment control may be a touch screen for a dual view touch screen apparatus, simultaneously presenting different displays to different users. The equipment control may be operatively connected to equipment within a vehicle. The evaluated control state may be associated with a first operator of the equipment if the signal is present and the evaluated control state may be associated with a second operator of the equipment control if the signal is not present. A signal from a signal generator may be transmitted, via an operator, to a conductive surface of the equipment control. The signal may be a capacitively, resistively, and/or electrostatically coupled signal generated by the signal generator. The evaluating of the control state may include determining a position of an input to the equipment control. The input to the equipment control may be associated, if the signal is present, to a first passenger of a vehicle, and the input to the equipment control may be associated, if the signal is not present, to a second passenger of a vehicle.

Equipment operation may be attributed to a specific operator from among a plurality of operators based on detecting the signal. The operators may include a driver and a front passenger in a motor vehicle. The signal may be operatively coupled with a front passenger seat of the motor vehicle. An occupant detection sensor may be used to indicate if a driver or a front passenger is occupying a front seat of a motor vehicle. The signal may be operatively coupled with the front passenger seat of the motor vehicle if the occupant detection sensor indicates that the front passenger seat is occupied. The signal may not be coupled with the front passenger seat if the occupant detection sensor indicates that the front passenger seat is not occupied. A button may be displayed on a dual view touch screen in a vehicle visible from a passenger view, and/or a button may be displayed on the dual view touch screen in the vehicle visible from a driver view. A function associated with a passenger in the vehicle may be activated if the touch screen is touched at a position corresponding to the button visible from the passenger view and the signal is present. A function associated with a driver in the vehicle may be activated if the touch screen is touched at a position corresponding to the button visible from the driver view and the signal is not present. The second function equipment function may be rendered inactive if the signal is not present and the vehicle is moving.

In another general aspect, an apparatus for controlling equipment operable by a plurality of operators includes a control state evaluation device configured to evaluate a control state of an equipment control, a signal detection device configured to detect if a signal associated with an operator of the equipment control is present, and a process controller. The process controller is configured to activate a first equipment function if the signal from the equipment control is present, and is configured to activate a second equipment function if the signal is not present.

One or more of the foregoing aspects provides a mechanism for selectively activating equipment functions based on the location of the operator. Various features may be enabled that benefit from the knowledge of the location of an operator for reasons of operator safety, reduction of the number of physical controls, and/or the enablement of dual view touch screen user interfaces.

In another general aspect, a system for controlling vehicle equipment via a touch screen apparatus, includes a first conductive surface operatively connected to a first signal generator, a second conductive surface operatively connected to the first signal generator or a second signal generator, and the touch screen apparatus. The touch screen apparatus includes a dual view touch screen, a control state evaluator operatively connected to the touch screen, a signal detector operatively connected to the touch screen, and a process controller configured to detect an output from the signal detector and an output of the control state evaluator. The process controller is configured to activate a first function based upon a detected signal from the first conductive surface, and to activate a second function based upon a detected signal from the second conductive surface.

In another general aspect, a touch screen apparatus includes a dual view touch screen, the dual view touch screen enabling control of vehicle equipment though a first operator and at least a second operator upon touching a screen of the dual view touch screen, and a process controller for activating a first function based upon a first signal associated with the first operator and for activating a second function based upon a second signal associated with the second operator, the first signal being provided to the process controller when the first operator touches the screen and the second signal being provided to the process controller when the second operator touches the screen. The first signal and the second signal can be generated by at least one signal generator. The first function and the second function can each control functions of the vehicle equipment and can each be associated with the first operator and the second operator, respectively.

The following detailed description of the invention is merely exemplary in nature and is not intended to limit the invention or the application and uses of the invention. Furthermore, there is no intention to be bound by any theory presented in the preceding background of the invention or the following detailed description of the invention.

DESCRIPTION OF THE DRAWINGS

FIG. 3 is a table showing alternative control configurations for a passenger or driver of a vehicle.

DETAILED DESCRIPTION

Figure 1:
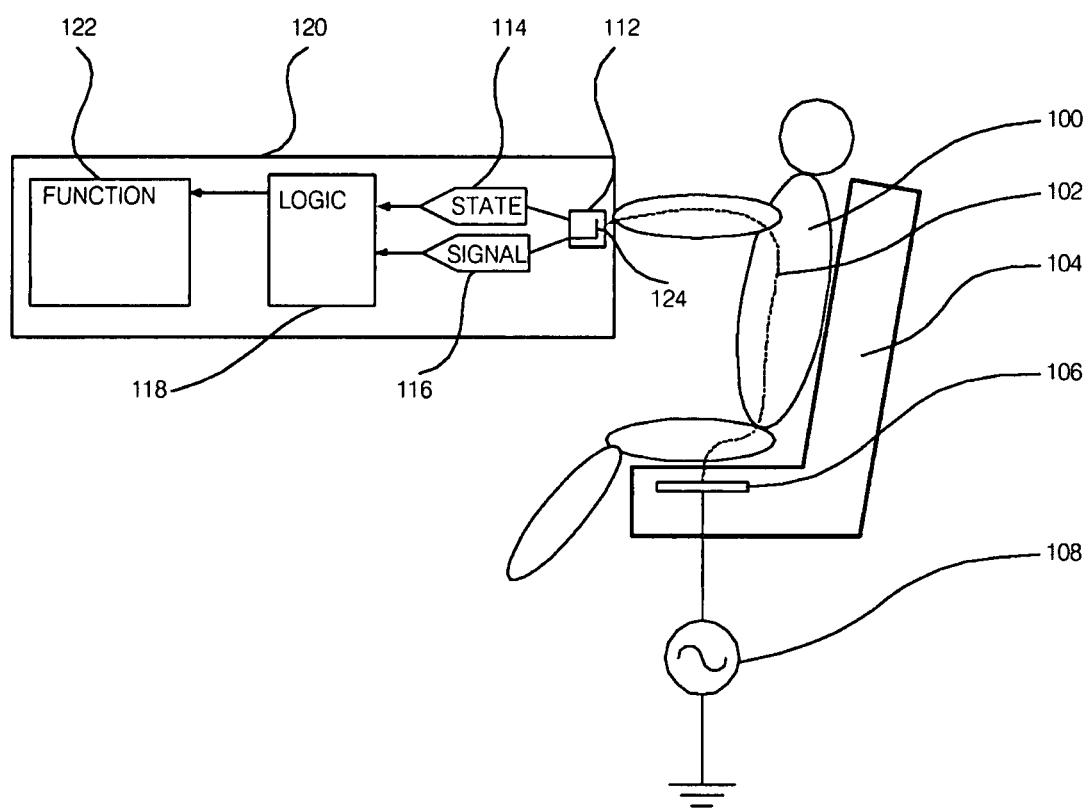
FIG. 1 is an illustrative diagram showing an aspect of the present invention as applied to a seated equipment operator of a vehicle.

Referring to FIG. 1, an exemplary system for detecting and implementing operator specific functions includes a signal generator 108, a driver or passenger operator 100 seated in a seat 104 and equipment 120 for implementing function 122. An equipment operator 100, such as the driver or the front passenger in an automobile, is seated in seat 104 for operating equipment 120 through a control 112, e.g. switches, knobs, buttons, rotary controllers and touch screens, used to control various pieces of equipment, e.g. interior lights, radio, CD-player, navigation system, phone and air conditioning. A signal generated by the signal generator 108 is coupled with the operator 100 via a conductive surface 106 while the operator 100 is seated in seat 104. The coupling is capacitive in nature because the conductive element 106 is insulated from the user by clothing, the seat cushion, etc. The signal is passed along a path 102 through the posterior portions, e.g., buttocks, thighs and back, to the operator's extremities, e.g., finger, hand and wrist, from which the signal is passed to a resistively conductive element 124 located inside the control 112 and/or in proximity to the surface of control 112. The passing of the signal from the operator's extremities to conductive element 124 is capacitive in nature and not affected by the conductivity between the operator 100 and control 112, which may be generally unpredictable.

Capacitive coupling is preferred due to the possibility of operator 100 wearing electrically insulating gloves. Signal detector 116 detects whether a signal consistent with the characteristics of the signal generated by signal generator 108 is present at conductive element 124. Activation of control 112 is detected by a control state evaluator 114. The outputs of control state evaluator 114 and signal detector 116 are passed to logic unit 118 where signal presence and control state are logically combined to activate a controller for implementing function 122. The logic unit 118 may include a process controller, e.g., with memory and circuitry, configured to perform various control and logic functions. Although the logic unit 118, control state evaluator 114, and/or signal detector 116 are shown as monolithic devices, each may be integrated into a single microprocessor, share common hardware and circuitry, and/or may be embodied as individual components within one or more modules within or operatively connected to the equipment 120. In one embodiment, function 122 may include generating a serial data signal that is transmitted from equipment 120 to another piece of equipment in the vehicle, for example via a communication bus such as a controller area network (CAN), local interconnect network (LIN) or Flexray.

If the surface of control 112 is resistively conductive, the resistively conductive element 124 can be omitted and signal detector 116 directly connected to the surface of control 112. Signal detector 116 may detect the signal when the operator's extremities are resistively coupled with the surface of control 112. Alternatively, or additionally, the signal detector 116 may detect where the signal is capacitively coupled with the surface of control 112, e.g., so as not to be affected by operators garment such as gloves.

Figure 2:
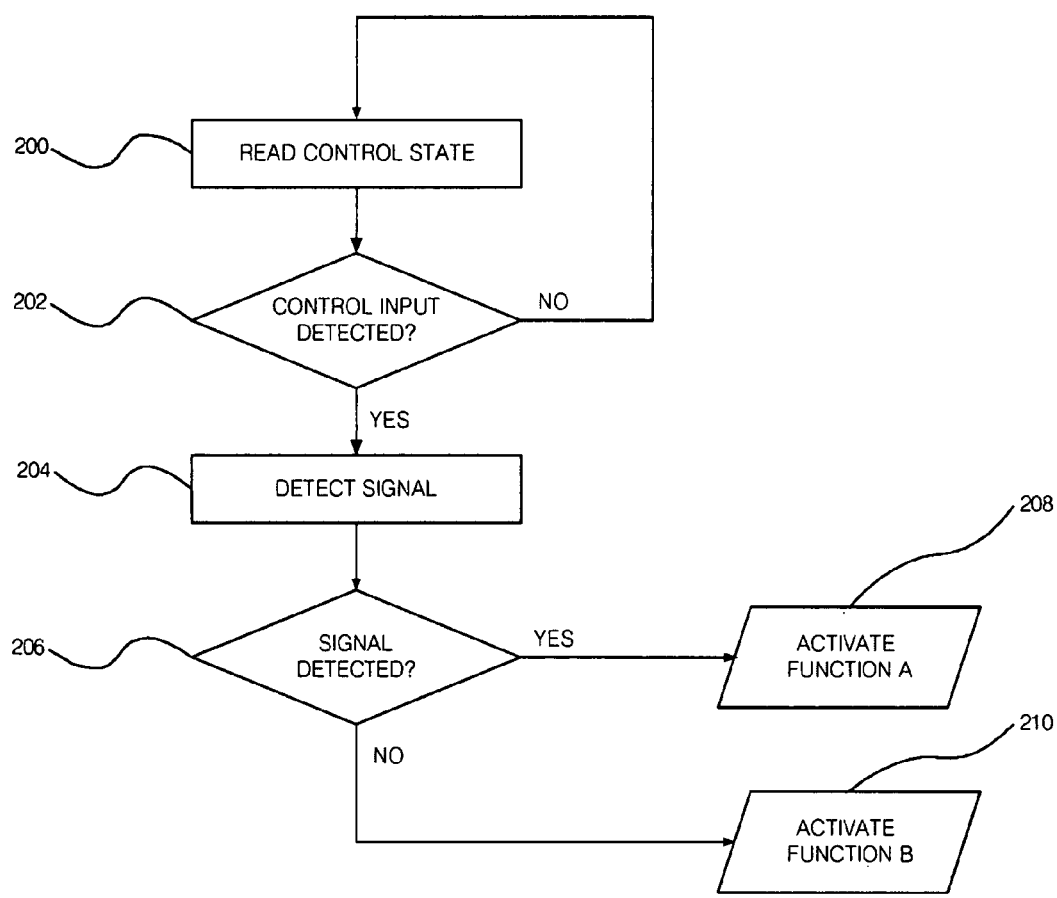
FIG. 2 is a flow diagram depicting an exemplary process for activating equipment functions.

Referring to FIG. 2, an exemplary process for selectively activating functions A, B, includes reading a control state 200 and detecting a control input 202 to determine if a control input has occurred. The process steps of reading the control state 200 and evaluating control input 202 may be repeated, such as periodically according to a predefined interval, until a control input is detected. When a control input is detected, the process proceeds to step 204. In step 204, the signal detector 116 attempts to detect the signal generated by signal generator 108. Next, in step 206, it is determined whether or not the signal was detected. If a signal is detected, the equipment 120 activates function A 208 with logic 118. If a signal is not detected, the equipment 120 activates function B 210 with logic 118.

Accordingly, the signal generator 108 and signal detector 116 can be used to detect the presence of a signal (or the lack of a signal) to selectively activate either function A or function B. For example, when the structure of FIG. 1 is applied to the driver's seat in a motor vehicle, one signal generator 108 and one signal detector 116 can be used to selectively activate various driver and/or passenger functions, depending upon whether or not a signal is received when an input is received, or is not received when an input is received.

Referring to the table of FIG. 3, various functions relating to operator safety, vehicle, passenger, and/or environmental controls may be implemented using the process of FIG. 2. The table of FIG. 3 may be stored as a look-up table within memory of the equipment 120, e.g., to enable the system to distinguish the driver from the passenger and/or in order to enable use of common controls between the driver and/or the passenger.

For example, safety control 300 relates to a driver lockout configuration. In this configuration, a signal is coupled with the driver's seat. If presence of the signal is detected by the signal detector 116 at the control 112, the equipment function 122 is deactivated, thus establishing a lockout of the control 112 to the driver. If the signal is not present at the control 112, normal operation is allowed, e.g., thus allowing a passenger to control the equipment.

Safety control 302 relates to a driver only configuration. In this configuration, a signal is coupled with the driver's seat. The respective control is operative only if presence of the signal is detected by the signal detector 116 at the control 112. If the signal is not detected, the control 112 is inactive, e.g., thus allowing only the driver to operate the control 112.

Safety control 304 relates to a passenger only configuration. In this configuration, a signal is coupled with the passenger's seat. The control is operative only if presence of the signal is detected by the signal detector 116 at the control 112. If a signal is not detected, the control 112 is inactive, e.g., thus allowing only the passenger to operate the control 112.

Safety control 306 relates to a passenger lockout configuration. In this configuration a signal is coupled with the passenger's seat. If presence of the signal is detected by the signal detector 116 at the control 112, a lockout of the passenger is established by the equipment 120. If the signal is not present at the control 112, normal operation is allowed, e.g., thus enabling the driver to control the equipment.

Common control 308 relates to a driver default configuration. In this configuration, the signal is coupled with the passenger's seat. If presence of the signal is detected by the signal detector 116 at the control 112, the passenger function is activated. If the signal is not present at the control 112, the driver function is activated.

Common control 310 relates to a passenger default configuration. In this configuration, the signal is coupled with the driver's seat. If presence of the signal is detected by the signal detector 116 at the control 112, the driver function is activated. If the signal is not present at the control 112, the passenger function is activated.

While some of the foregoing configurations are similar in scope, e.g. driver lockout and passenger only configurations, the differences between the various configurations may make the configurations more or less desirable for certain applications. For example, one design consideration when choosing a configuration is the failure modes of the configuration. For example, various failures may lead to the signal not being detected at the control 112, even though the operator is seated in the seat into which the signal is coupled, e.g., failure of the signal generator, wiring failures between the signal generator and the conductive surface in the seat, lower than necessary capacitive coupling through the operator, and failures in the signal detection. In consideration of these possible equipment failures, a particular configuration may be chosen such that the vehicle equipment 120 reverts to a safe or default state in the event of a system failure.

The driver lockout configuration 300 may be used where manipulation of the driver lockout configuration is of no concern and/or removal of the driver lockout in case of a failure is desirable. For example, if, due to failure or manipulation, no signal is detected at the control 112, even though it is operated by the driver, the lockout is not activated. Even though lockouts are implemented to increase operator safety by preventing access where equipment operation could be dangerous, such lockout may be considered undesirable paternalism to the operator. An operator may therefore try to remove the lockout by manipulation, e.g. disabling of the signal generator 108, disconnecting of wires between the signal generator 108 and the conductive surface 106 in the seat 104, and/or disabling of a power supply required by the signal generator. Therefore, where manipulation is a concern, the equipment may maintain an active lockout in cases of equipment failure, as does the passenger only configuration 304. The passenger only configuration 304 can be further enhanced by activating the signal generator 108 coupled to the passenger seat 104 only when a passenger is present, e.g., as indicated by an occupant detection sensor.

The driver may be prevented from performing certain complex tasks requiring relatively high concentration and/or activity by the operator, such as spelling a destination in a navigation system, e.g., while the driver is operating the vehicle or the vehicle is in motion. However, it may be desirable to allow a front passenger to spell a destination independently of whether the vehicle is in motion. In this example, the passenger only configuration 304 may be the most desirable as this configuration is least susceptible to manipulation, e.g., through disconnecting the signal generator 108, removal of a fuse or cutting of a wire. Any such manipulation may result in the passenger being prevented from operating the navigation system, and/or the driver not being able to operate the navigation system while it is locked out. Alternatively, or additionally, an occupant detection sensor can be used to prevent a driver from fooling the system by imitating the presence of a passenger within the vehicle. For example, an occupant detection sensor may also be used to prevent the risk of the driver touching the passenger seat with one hand and controlling the navigation system with the other hand in order to establish a path for the signal from the passenger seat to the control to simulate the control being operated by the front passenger. In this case, the signal generator coupled to the front passenger seat may only be activated when an occupant is detected with the occupant detection sensor, such as an occupant detection sensor typically provided in a vehicle for monitoring the use of safety belts.

Although the driver only configuration 302 and passenger lockout configuration 306 are similar, an equipment failure may still allow the driver to activate a function in case of the passenger lockout configuration 306, while the same failure in driver only configuration 302 may result in disabling the function altogether.

In another example, the ability to start a vehicle engine may be limited to the driver occupying the driver seat. For example, a keyless go system may allow starting the engine by the push of an engine start button as long as a wireless driver identification device is located within a specified area around the driver seat. Accordingly, the start button is located in the vehicle such that it can only be reached from the driver and the front passenger seat. In this example, the passenger lockout configuration 306 actively prevents the front passenger from accidentally starting the engine, while the driver's ability to start the engine may not be impacted in the event of equipment failure.

Accordingly, the system may be used to selectively activate certain functions in a vehicle for the driver and/or front passenger. The same control operation, e.g., push of a button, rotation of a knob, and/or manipulation of a touch screen, can be used to activate one function when performed by the driver and a different function when performed by the front passenger. The use of the same control operation for the driver and the passenger may be particularly advantageous for traditionally redundant controls, such as to control the same function for driver and passenger side of the vehicle, e.g., seat adjustments, control of reading lights, power windows lifters, climate settings, and/or door locks. The driver default configuration 308 may maintain the driver's ability to control all functions on the driver's side of the vehicle even in the case of an equipment failure, while the passenger functions may be disabled. With respect to the passenger only configuration 304, the passenger lockout configuration 306 and the driver default configuration 308, these configurations are based upon the signal being coupled into the passenger seat.

Figure 4:
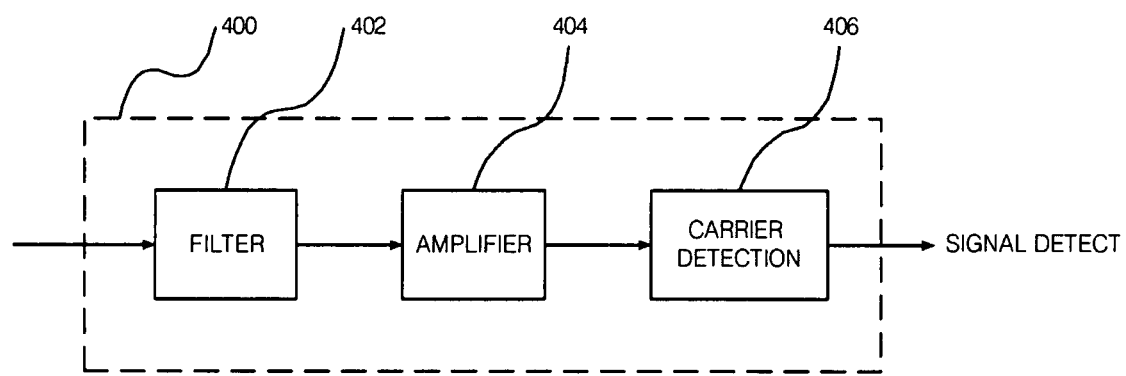
FIG. 4 is a block diagram of an exemplary process for detecting a signal.

Referring to FIG. 4, an exemplary electronic signal detector circuit 400 which is used to detect the presence of the signal at the control 112 includes a filter 402 to eliminate or reduce susceptibility of the signal detector 400 to noise, an amplifier 404, and a carrier detection device 406. For example, the signal may be a 50-150 kHz sine wave, which is relatively easy to detect and unlikely to interfere with other vehicle modules or radio reception. Accordingly filter 402 is a low pass or band pass filter tuned to let the carrier frequency pass and to remove higher (in case of the low pass filter), or higher and lower frequencies (in case of the band pass filter). In order to avoid electromagnetic interference problems with other vehicle systems, the signal coupled into the seat may use a low alternating voltage of typically less than 1 Volt. Accordingly signal detector 400 should be able to detect very weak signals of less than 0.1 Volts. The amplifier 404 is used as part of signal detector 400 to provide the necessary sensitivity to weak signals. The carrier detection block 406 is used to generate a binary signal detect output for further processing. A tone decoder integrated circuit can be used for carrier detection.

While signal detector circuit 400 represents one simple and low cost embodiment, several modifications to this circuit are possible. For example, the signal can be modulated to reduce the risk of false detections. In this case, the signal detector not only checks for the presence of a carrier, but also a correct modulation. Also, the output of carrier detection can be in the form of an analog value representing signal strengths, such that the downstream logic can distinguish valid from invalid signals based on the received signal strengths.

The conductive surface 106 in the seat 104 used for capacitive coupling between the signal generator 108 and the operator can be a flexible plate or conductive mesh located just beneath the seat surface. Where the vehicle is equipped with heated seats, the heated seat matt can be used for coupling the signal with the operator. However, in this case the low resistance of the heating matt, which is typically less than 10 Ohms, may make it difficult to couple a sufficiently strong signal into the operator. While an alternating voltage below one Volt against the vehicle ground is enough to be detected at the control 112 by the signal detector 116, such voltage would cause relatively high currents of more than 100 mA in the seat heating matt resulting in undesirable losses (if the seat heating is turned off), may require expensive parts in the signal generator 108, and may cause electromagnetic interference problems with other electronic equipment. When the seat heating is turned on the even lower resistance between the side of the seat heating matt connected to battery and the vehicle battery, which itself has very low resistance, may also present additional challenges.

Figure 5:
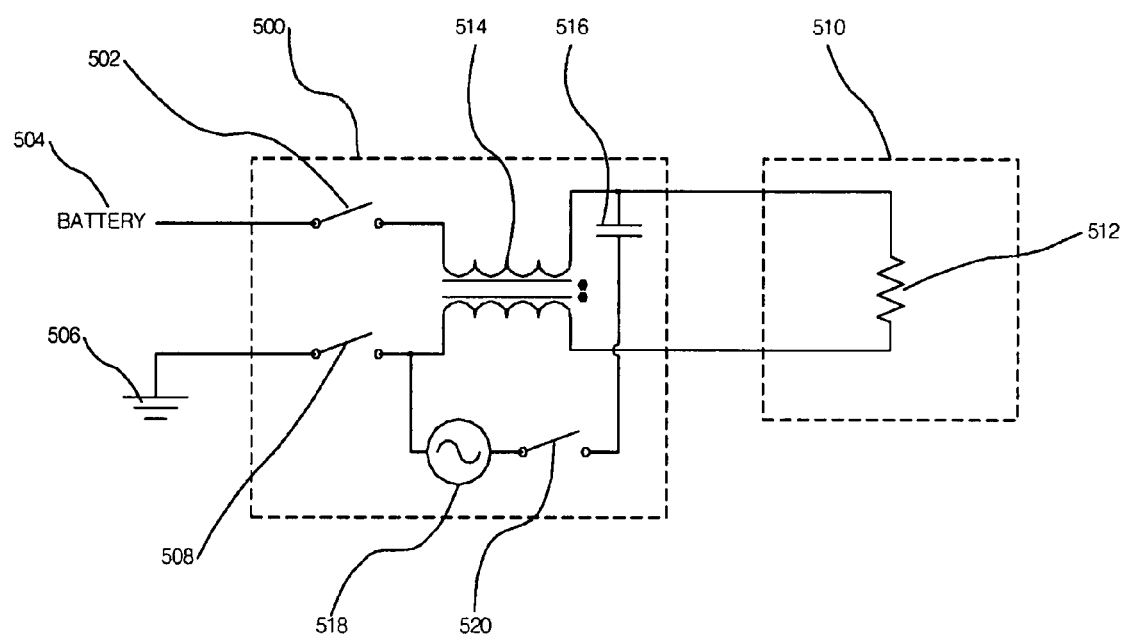
FIG. 5 is a schematic diagram showing an example of a signal coupled with a seat heating matt.

Referring to FIG. 5, low seat heating matt resistance is overcome while also using the heating matt to couple a signal with the seated operator. An exemplary seat heating matt 510 includes a resistive heating element 512 wired to a seat control module 500. The control module 500 contains switches 502 and 508 which connect the seat heating matt 510 to a battery 504 and vehicle ground 506, respectively. While shown as simple switches, it should be noted that switches 502 and 508 are typically semiconductor switches or relays controlled by a microprocessor. In order to use the seat heating matt 510 to couple the signal from a signal generator 518 into the operator, a common mode rejection choke 514 is connected in series with the seat heating matt 510. The inductivity of one common mode rejection choke 514 is chosen such that its AC impedance at the preferred signal frequency of 50-150 kHz is sufficiently high so that signal generator 518 can operate at the desired alternating voltage. Using the common mode rejection choke 514; the entire seat heating matt's potential can alternate relative to vehicle ground 506, while keeping the resulting alternating current low due to the relatively high impedance of the common mode rejection choke 514 at the operating frequency.

The signal generator 518 is connected to the seat heating matt 510 through a capacitor 516 so that the signal generator 518 is not affected by the seat heating being on or off, and switches 502 and 508 being closed or open. Switch 520 may be implemented to permit additional criteria to enable the signal generator 518. For example, if the seating matt 510 is located inside the passenger seat, switch 520 permits the signal generator 518 to be activated only when an occupant is detected in the passenger seat. However, switch 520 does not physically need to exist, as the effect of switch 520 may be achieved through a microprocessor controlled activation and deactivation of signal generator 518 based on a hardwired or serial data input, e.g., from a seat occupant sensor.

In one embodiment, the general system of FIG. 2 is applied to a dual view display which displays two images, e.g., wherein each image is visible to the exclusion of the other when the display is viewed from particular angles. Dual view displays are used in vehicles to allow the driver and the front passenger to see different images on the same display, e.g. to show navigation information to the driver while the passenger watches a DVD movie. While such displays enable advanced infotainment features, the versatility of these displays is limited if used in combination with a traditional touch screen. While it is possible that a user interface includes buttons displayed to the driver and buttons displayed to the passenger that are each placed on the screen in mutually exclusive positions, this approach may become less practical with a user interface integrating numerous functions for the driver and/or passenger. Accordingly, by attributing a touch operation to a particular operator when applied to the control, e.g., the dual view display, the touch screen may incorporate many separate functions for both the driver and the passenger in a single interface.

Figure 6:
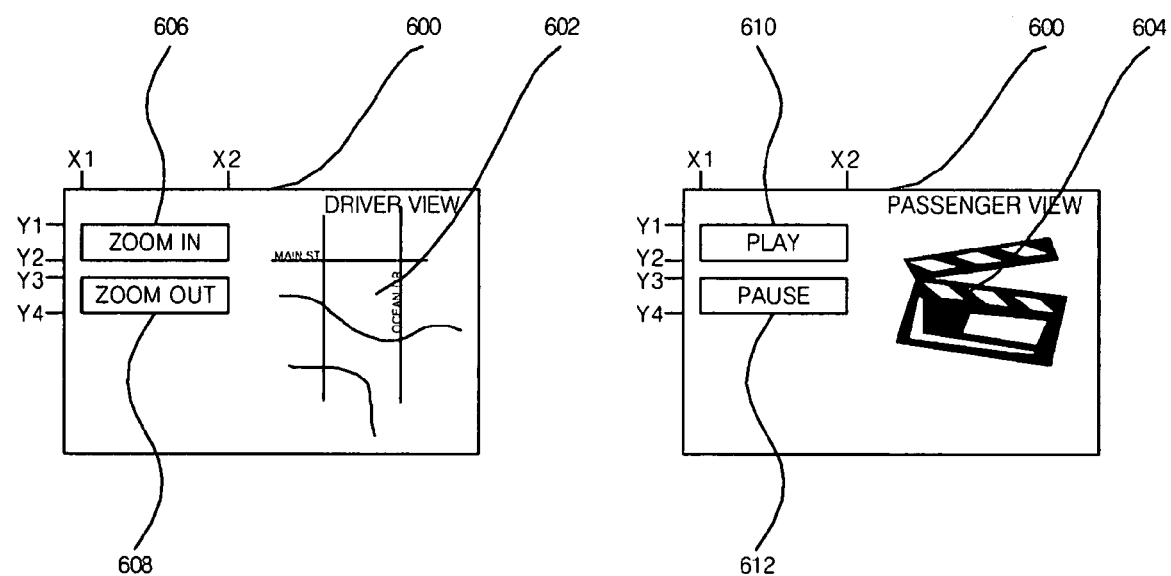
FIG. 6 is a diagram showing an example of a dual view display from different viewing angles.

Referring to FIG. 6, an exemplary dual view touch screen display 600 includes a passenger view and a driver view. While the driver may view a navigation map 602 when looking at the display 600, the passenger may view DVD movie images 604 when looking at the same display 600. A button 606 is located between coordinates X1, Y1 to X2, Y2 in a driver view and is visible only from direction of the driver seat. The button 606 is a zoom in button which, when touched, zooms in the map display. A button 610, visible only from the direction of the passenger seat and which when touched plays the movie, is also located between coordinates X1, Y1, to X2, Y2. Similarly, located between coordinates X1, Y3 to X2, Y4 is a button 608 for the driver to zoom out the map and a button 612 for the passenger to pause the movie. A signal is generated and coupled with the passenger seat, and then passes via the operator sitting in the passenger seat to the touch screen display to assist in the recognition of the passenger or driver touch screen inputs.

Figure 7:
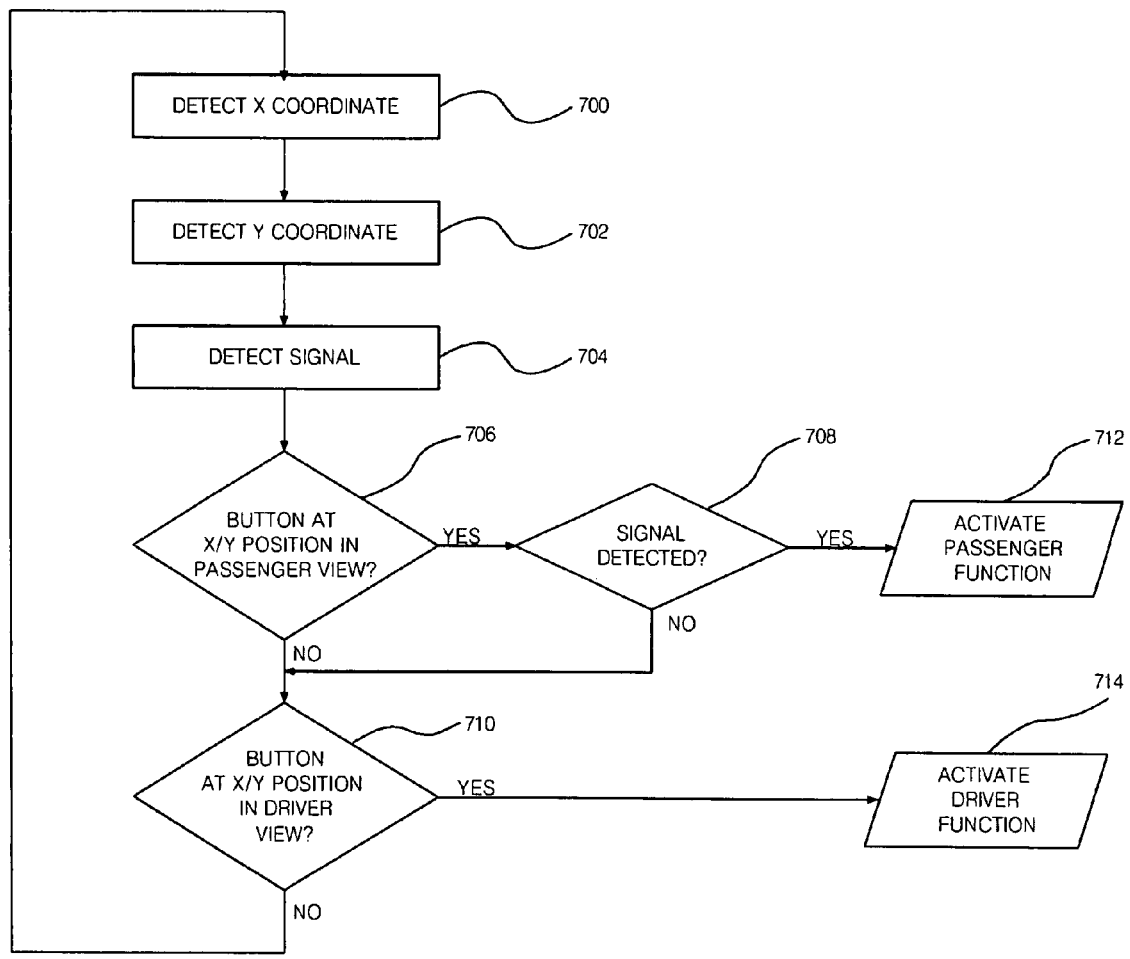
FIG. 7 is a flow diagram of an exemplary process applied to a dual view display.

Referring to FIG. 7, an exemplary method of attributing a touch operation to a particular operator is applied to the control of a dual view touch screen user interface. When a touch operation is detected, the location of the touch input and the presence of the signal at the touch screen are determined, e.g., by a signal detector and control state evaluator. Specifically, the horizontal position of the touch input is detected (700), the vertical position of the touch input is detected (702), and the presence of the signal is also detected (704). The control state evaluator next determines if the button corresponding to the touch input is located at the detected position in the image visible only from the passenger seat (706). If the signal detector also determines that the signal is present, e.g., from the signal generator, (708), the corresponding passenger function is activated (712). If the signal had not been detected, or if no button is visible to the passenger at the detected touch location, the process continues to process step 710. In step 710, the control state evaluator determines if a button is visible to the driver at the detected touch location. If the button is visible to the driver at the detected location, the corresponding driver function is activated in step 714. If the button is not visible to the driver either, the touch input is ignored and the process is repeated upon the detection of a new input. Alternatively, the user may be prompted that an erroneous touch input has been detected, e.g., with an audible error tone. Alternatively, or in addition, a signal detection step, e.g., similar to step 708, may be provided between step 710 and step 715 to ensure that an erroneous signal and/or touch position is not incorrectly attributed to the driver, and/or to detect discrete signals if unique signals are generated for each operator.

Figure 8:
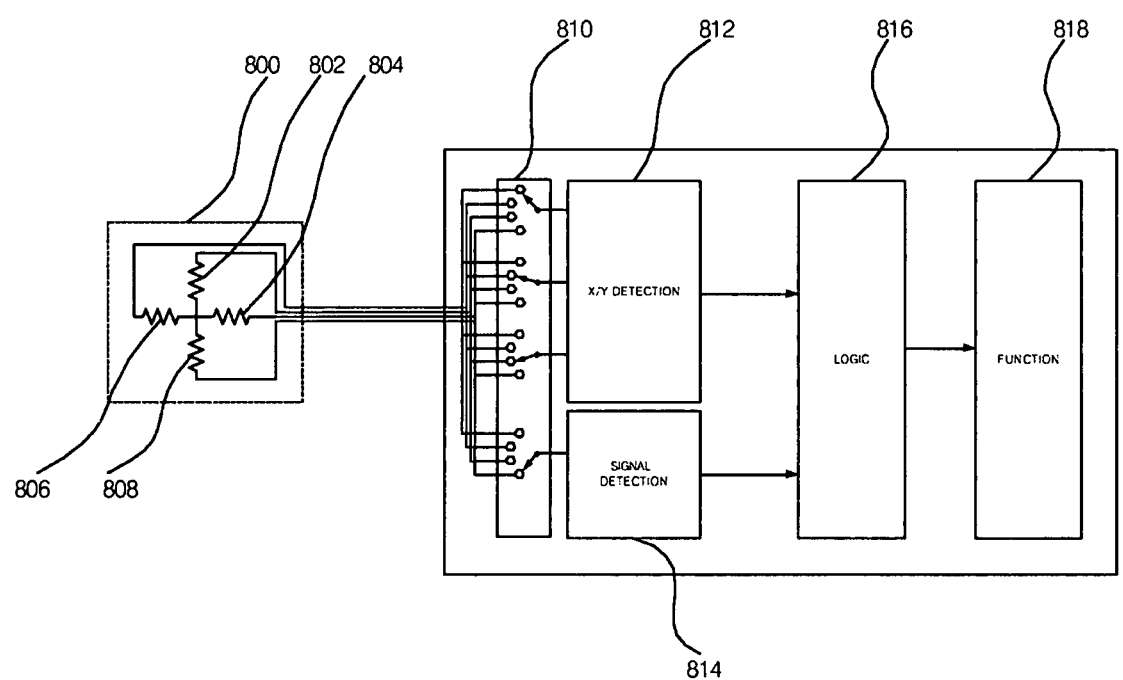
FIG. 8 is a schematic diagram of an exemplary touch screen control.

Referring to FIG. 8, exemplary hardware and logic involved in the detection of the location of a touch input and/or the detection of the signal received through an exemplary four wire resistive touch screen 800. A typical four wire resistive touch screen 800 includes two resistive layers separated by thin space. When an object, such as the user's fingertip, touches the surface of the touch screen, the resistive layers are connected at a certain position, effectively creating two voltage dividers in the x-axis and two voltage dividers in the y-axis. The total x-axis resistance is divided into two resistances 806 and 804, while the total y-axis resistance is divided into resistances 802 and 808. The four wire resistive touch screen 800 is connected to a switch matrix 810 which alternatively applies a reference voltage at either the horizontal or vertical axis to measure the position of a touch input. An x/y detection block 812 applies the reference voltage and evaluates the voltage divider. Simultaneously, or sequentially, the presence of a signal at the touch screen is evaluated by signal detection block 814. The output of both the touch location (x/y) detection 812 and signal detection 814 are inputs to logic 816, which selectively activates functions 818 based on the location of the touch input and the presence (or absence) of the signal. The process described above in connection with FIG. 7 may be implemented by the hardware and logic shown in and described in connection with FIG. 8.

Figure 9:
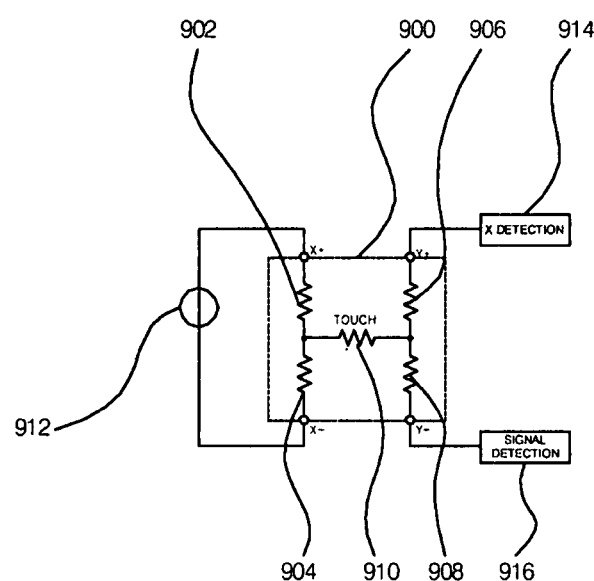
FIG. 9 is a schematic diagram of an exemplary touch screen operating point on a touch screen.

Referring to FIG. 9, a schematic view of the touch screen evaluation is shown during the x-position detection and while the signal is being detected. In this instance, a reference voltage 912 is applied along the x-axis. A touch input on the screen divides the total x-axis resistance into two resistances 902 and 904. At the touch location a resistive connection is made between the two otherwise separated layers, here represented by touch resistance 910. The y-axis is divided into resistances 906 and 908. While the position of the touch input can be determined through resistances 910 and 906 in the detection circuit 914, a presence of a signal can simultaneously be detected at signal detector 916. In this case, the input of signal detector 916 has a very high impedance so as not to interfere with the x-position detection 914. However, the individual steps of determining touch position (x and/or y position) and/or detecting the signal can be performed sequentially and/or simultaneously.

Although the foregoing exemplary embodiments have been described in connection with a dual view touch screen, the foregoing processes may be applied to various other pieces of equipment implementing various controls. For example, the equipment may include one or more of a radio, a navigation system, a rear seat entertainment system, a reading lamp, a power window lifter, an HVAC system, a navigation system, and/or a phone. Accordingly, the control or controls may be related to one or more of receiving and playing a radio broadcast, lighting portions of an interior of a vehicle, driving window(s) up and down, providing heating or cooling, selecting a travel destination, providing route guidance, and/or conducting phone calls. One or more of the controls may be manipulated by an operator through controls such as switches, knobs, buttons, rotary controllers, input devices, and/or, touch screens.

Although the foregoing embodiments have been described in connection with a signal generator operatively coupled to a conductive surface, such as within a driver's seat or front passenger's seat adjacent to the driver's seat, one or more signal generators may be implemented within a vehicle system. For example, each passenger's seat may include a dedicated signal generator generating a discrete and recognizable signal for each passenger. Alternatively, or in addition, a single signal generator may produce a signal or signals that may be associated with multiple passengers within a vehicle. For example, a single signal generator may produce a signal that is sent to each passenger seat and may then be modified, such as with a band pass filter provided in each vehicle seat, to produce a discrete and recognizable signal for each passenger. A single signal detector, state evaluator, and/or process controller may then be used to recognize multiple signals and/or the absence of signals to further enhance the multi-function capability of one or more equipment controls within a vehicle or stationary system. The equipment may include one or more vehicular systems and/or be applied to other applications, such as stationary terminals or systems likely to be used by multiple users and/or that provide control for multiple functions. The control may implement one or more functions for controlling various equipment operations, such as adjusting or monitoring equipment functions or operations.

Although detailed embodiments and implementations have been described above, it should be apparent that various modifications are possible without departing from the spirit and scope of the present invention.

What is claimed is:

1. A system for controlling vehicle equipment, comprising:
    a signal generator;
    a conductive surface operatively connected to the signal generator; and
    a touch screen apparatus, wherein the touch screen apparatus includes
        a touch screen;
        a control state evaluator operatively connected to the touch screen;
        a signal detector operatively connected to the touch screen; and
        a process controller configured to detect an output from the signal detector and an output of the control state evaluator, wherein the controller is configured to activate a first equipment control function based upon a detected signal from the signal generator, and is configured to activate a second equipment control function if the signal detector does not detect any signal.

2. The system according to claim 1, wherein the conductive surface is provided within a passenger's seat within a vehicle.

3. The system according to claim 2, wherein the seat is a driver's seat.

4. The system according to claim 2, wherein the seat is a seat adjacent to a driver's seat within a vehicle.

5. The system according to claim 1, wherein the process controller is configured to associate a first system user, based upon the detected signal, with the output of the control state evaluator.

6. The system according to claim 5, wherein the process controller is configured to associate another system user, if the signal detector does not detect any signal, with the output of the control state evaluator.

7. The system according to claim 1, further comprising a seat operatively coupled with the signal generator, wherein the signal detector is configured to detect a signal passing from the signal generator, through the conductive surface and a user to the touch screen.

8. The system according to claim 7, wherein the signal detector is configured to detect the signal passing through an operator seated within the seat.

9. The system according to claim 1, wherein the signal generator is a keyless go device, and the process controller is configured to identify a user based upon the signal from the keyless go device.

10. The system according to claim 1, wherein the touch screen apparatus is a dual view touch screen device, capable of simultaneously presenting different displays to different users.

11. The system according to claim 1, wherein the conductive surface is a seat heating matt within a vehicle seat, and the signal generator is capacitively, resistively, or electrostatically coupled with the seat heating matt.

12. The system according to claim 11, further comprising a common mode rejection choke operatively connected between the seat heating matt and a vehicle power supply and ground.

13. The system according to claim 1, wherein the system includes a single signal generator.

14. The system according to claim 1, wherein a portion of vehicle equipment controls are designated as being exclusively operated by a driver of the vehicle.

15. A method for controlling equipment, the method comprising:
evaluating a control state of an equipment control;
detecting, using a signal detector, if a signal associated with an operator of the equipment control is present; and
based upon the evaluated control state:
activating a first equipment control function if the signal from the equipment control is present; and
activating a second equipment control function if the signal detector does not detect any signal.

16. The method according to claim 15, wherein the equipment control is a touch screen for a touch screen apparatus.

17. The method according to claim 15, wherein the equipment control is a touch screen for a dual view touch screen apparatus, simultaneously presenting different displays to different users.

18. The method according to claim 15, wherein the equipment control is operatively connected to equipment within a vehicle.

19. The method according to claim 15, further comprising:
associating the evaluated control state with a first operator of the equipment if the signal is present and associating the evaluated control state with a second operator of the equipment control if no signal is present.

20. The method according to claim 15, further comprising:
transmitting a signal from a signal generator, via an operator, to a conductive surface of the equipment control, wherein the signal is a capacitively, resistively, or electrostatically coupled signal generated by the signal generator.

21. The method according to claim 15, wherein evaluating the control state comprises determining a position of an input to the equipment control.

22. The method according to claim 21, further comprising:
associating the input to the equipment control, if the signal is present, to a first passenger of a vehicle; and
associating the input to the equipment control, if no signal is present, to a second passenger of a vehicle.

23. The method according to claim 15, further comprising:
attributing equipment operation to a specific operator from among a plurality of operators based on detecting the signal.

24. The method according to claim 23, wherein the operators comprise a driver and a front passenger in a motor vehicle, and the signal is operatively coupled with a front passenger seat of the motor vehicle.

25. The method according to claim 23, further comprising indicating, with an occupant detection sensor, if a driver or a front passenger is occupying a front seat of a motor vehicle.

26. The method according to claim 25, wherein the signal is operatively coupled with the front passenger seat of the motor vehicle if the occupant detection sensor indicates that the front passenger seat is occupied and the signal is not coupled with the front passenger seat if the occupant detection sensor indicates that the front passenger seat is not occupied.

27. The method according to claim 15, further comprising:
displaying a button on a dual view touch screen in a vehicle visible from a passenger view; and
displaying a button on the dual view touch screen in the vehicle visible from a driver view.

28. The method according to claim 27, wherein activating the first equipment control function comprises activating a function associated with a passenger in the vehicle if the touch screen is touched at a position corresponding to the button visible from the passenger view and the signal is present, and activating the second equipment control function comprises activating a function associated with a driver in the vehicle if the touch screen is touched at a position corresponding to the button visible from the driver view and no signal is present.

29. The method according to claim 27, further comprising rendering the second equipment control function inactive if no signal is present and the vehicle is moving.

30. An apparatus for controlling equipment operable by a plurality of operators, comprising:
a control state evaluation device configured to evaluate a control state of an equipment control;
a signal detection device configured to detect if a signal associated with an operator of the equipment control is present; and
a process controller configured to activate a first equipment control function if the signal from the equipment control is present, and configured to activate a second equipment control function if the signal detection device does not detect any signal.

31. The apparatus according to claim 30, wherein the signal detection device is configured to detect if a second signal associated with another operator of the equipment control is present.

32. A system for controlling vehicle equipment via a touch screen apparatus, comprising:
a first conductive surface operatively connected to a first signal generator;
a second conductive surface operatively connected to the first signal generator or a second signal generator; and
the touch screen apparatus, the touch screen apparatus comprising:
a dual view touch screen;
a control state evaluator operatively connected to the touch screen;
a single signal detector operatively connected to the touch screen; and
a process controller configured to detect an output from the signal detector and an output of the control state evaluator,
wherein the process controller is configured to activate a first equipment control function based upon a detected signal from the first conductive surface, and to activate a second equipment control function based upon a detected signal from the second conductive surface, and
wherein vehicle equipment controls are grouped into common controls, controls operable only by a driver of the vehicle and controls operable only by a passenger of the vehicle.

33. A touch screen apparatus comprising:
a dual view touch screen, the dual view touch screen enabling control of vehicle equipment though a first operator and at least a second operator upon touching a screen of the dual view touch screen;
a single signal detector operatively connected to the dual view touch screen; and
a process controller for activating a first function based upon a first signal associated with the first operator and for activating a second function based upon a second signal associated with the second operator, the first signal being provided to the process controller when the first operator touches the screen and the second signal being provided to the process controller when the second operator touches the screen, wherein the first signal and the second signal are generated by at least one signal generator and the single signal detector is configured to detect the first signal and the second signal, and wherein the first function and the second function each control functions of the vehicle equipment and are each associated with the first operator and the second operator, respectively, and wherein vehicle equipment controls are grouped into common controls, controls operable only by a driver of the vehicle and controls operable only by a passenger of the vehicle.

34. The touch screen apparatus according to claim 33, wherein the first signal and the second signal are provided from the at least one signal generator to the process controller via conductive surfaces that are respectively associated with the first operator and the second operator.

35. The touch screen apparatus according to claim 33, wherein the at least one signal generator comprises a first signal generator and a second signal generator.

36. A system for controlling vehicle equipment, comprising:

only one signal generator;

a conductive surface operatively connected to the single signal generator; and a touch screen apparatus, wherein the touch screen apparatus includes a touch screen;

a control state evaluator operatively connected to the touch screen;

a signal detector operatively connected to the touch screen and configured to detect a signal generated by the single signal generator through an operator; and a process controller configured to detect an output from the signal detector and an output of the control state evaluator, wherein the process controller is configured to distinguish between a driver of the vehicle and a passenger of the vehicle to determine which is the operator and enable or disable control of equipment functions based on the operator.

37. The system according to claim 1, wherein the touch screen is configured to operate multiple separate components within the vehicle, and wherein some of the components are operable by the driver of the vehicle and some are operable by the passenger of the vehicle.

* * * * *